US006964114B1

(12) United States Patent
Chen

(10) Patent No.: US 6,964,114 B1
(45) Date of Patent: Nov. 15, 2005

(54) STRUCTURE TAPE RULE

(76) Inventor: Michael Chen, No. 126, Pao Chung Road, Hsin Tien City, Taipei Hsien (TW)

( * ) Notice: Subject to any disclaimer, the term of this patent is extended or adjusted under 35 U.S.C. 154(b) by 0 days.

(21) Appl. No.: 10/878,374

(22) Filed: Jun. 29, 2004

(51) Int. Cl.[7] .................................... G01B 3/10
(52) U.S. Cl. .......................... 33/755; 33/761; 242/371; 242/376
(58) Field of Search .......................... 33/755, 761, 768, 33/769, 770; 242/371, 375, 376

(56) References Cited

U.S. PATENT DOCUMENTS 2,510,939 A * 6/1950 Carlson ...................... 242/375
2,997,251 A * 8/1961 Chafin ........................ 242/375
3,705,962 A * 12/1972 Banister ..................... 242/375
4,527,334 A * 7/1985 Jones et al. .................... 33/761
5,094,396 A * 3/1992 Burke ........................ 242/375
5,134,784 A * 8/1992 Atienza ....................... 33/769
5,172,486 A * 12/1992 Waldherr ..................... 33/770
6,751,883 B2 * 6/2004 Liao ........................... 33/755
6,804,899 B2 * 10/2004 Murray ........................ 33/755

* cited by examiner

*Primary Examiner*—G. Bradley Bennett
(74) *Attorney, Agent, or Firm*—Rosenberg, Klein & Lee

(57) ABSTRACT

An improved structure tape rule in which the blade spool has space at one side of one-piece construction for containing the coiled spring, enabling the blade spool to accommodate the winding of a ruler blade that is approximately two to three times longer than a blade spool in a same diameter sized spatial area and, furthermore, the rewinding of the ruler blade is impelled by spring torque to thereby enhance tape ruler utility and performance.

1 Claim, 6 Drawing Sheets

STRUCTURE TAPE RULE

BACKGROUND OF THE INVENTION

1) Field of the Invention

The invention herein relates to an improved structure tape rule, specifically an original structural arrangement in which the blade spool has space at one side of one-piece construction for containing the coiled spring, enabling the blade spool to accommodate the winding of a ruler blade that is approximately two to three times longer than a blade spool in a same diameter size spatial area and, furthermore, the rewinding of the ruler blade is impelled by spring torque to thereby enhance tape ruler utility and performance.

2) Description of the Prior Art

A conventional tape rule utilizing an internal blade spool consists of a concentric spring at the center and a ruler blade wound around the exterior, a hook riveted to the front end of the ruler blade, and a center shaft projecting from the inner side of a left case half for inserting the center section of the spring in the blade spool; screws are respectively inserted through mounting holes in the right case half on the other side and fastened to the center shaft and mounting posts of the left case half to thereby assemble the said tape rule. Given the structure of the conventional tape rule, since there is a concentric spring coiled in the said blade spool, the said spring occupies space at the center of the blade spool and the remaining space can only be used for winding the tape ruler blade, a conventional tape ruler blade has a length of approximately five meters; furthermore, extending the length of the tape ruler blade requires an increase in the diameter of the blade spool and, at the same time, when the tape ruler blade is utilized for measurements and pulled out longer distances, the rewinding torque of the spring must be considered in that additional space will be needed to fit a stronger spring; however, to meet ergonomic concerns, since the maximum dimensions of the tape rule housing is limited to what the average hand is capable of grasping, increasing the diameter of the blade spool is difficult. As a result, to facilitate tape rule usage, the applicant of the invention herein conducted extensive research and development based on many years of specialized production experience to further enhance the practical value of the invention herein which following repeated testing and refinement culminated in the improved tape rule structure of the present invention.

SUMMARY OF THE INVENTION

Therefore, the primary objective of the invention herein is to provide an improved structure tape rule, specifically an original structural arrangement in which the blade spool has space at one side of one-piece construction for containing the coiled spring, enabling the blade spool to accommodate the winding of a ruler blade that is approximately two to three times longer than a blade spool in a same diameter size spatial area and, furthermore, the rewinding of the ruler blade is impelled by spring torque to thereby enhance tape ruler utility and performance.

To enable the examination committee a further understanding of the structural features, innovative content, and advantages of the invention herein, the brief description of the drawings below are accompanied by the detailed description of the embodiments

DETAILED DESCRIPTION OF THE INVENTION

Figure 1:
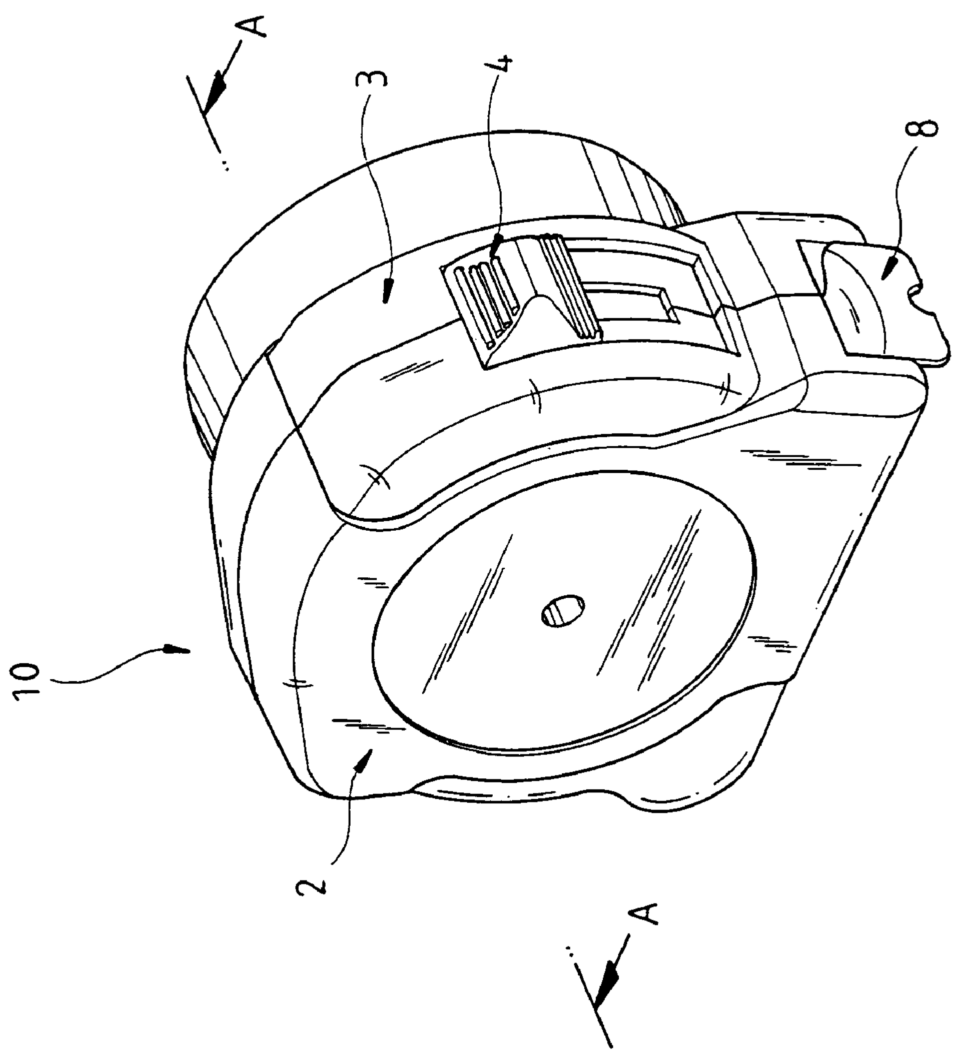
FIG. 1 is an isometric drawing of the invention herein.
Figure 2:
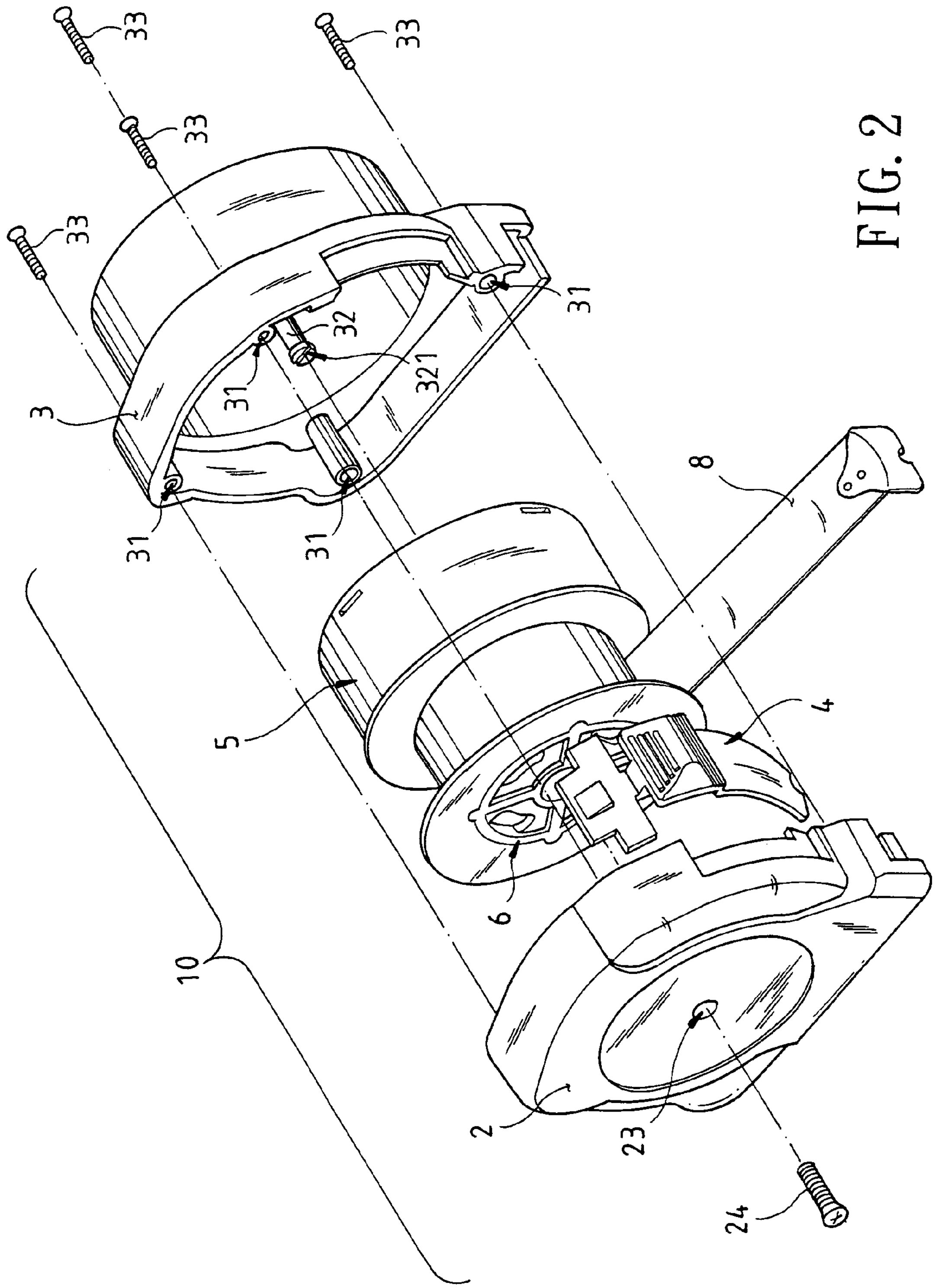
FIG. 2 is an exploded drawing of the invention herein.
Figure 3:
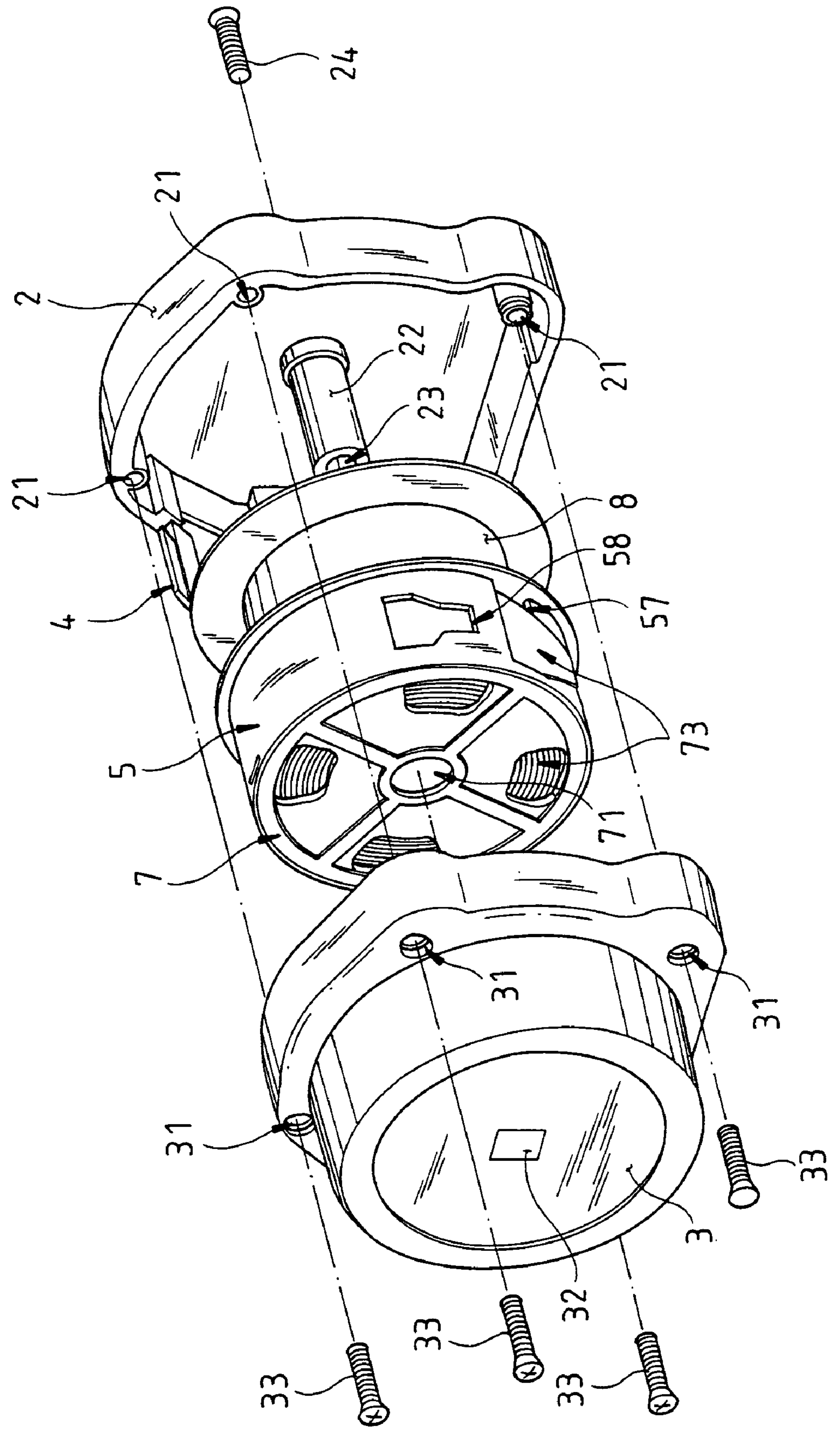
FIG. 3 is an exploded drawing of the invention herein.

Referring to FIG. 1, FIG. 2, and FIG. 3, the improved structure tape rule 10 of the invention herein is comprised of a left case half 2, a right case half 3, a blade lock 4, and a blade spool 5, wherein:

The left case half 2 is of one-piece plastic construction, a plurality of threaded holes 21 are disposed along the interior periphery of the said left case half 2 and, furthermore, a shaft tube 22 protrudes from the center of the interior, and a round hole 23 is disposed through the center of the shaft tube 22.

The right case half 3 is of one-piece plastic construction, a plurality of mounting holes 31 are disposed along the interior periphery of the said left case half 2 and, furthermore, a metal center shaft 32 is situated inward from the center of the left case half 2, the metal center shaft 32 having a circular rod-shaped, horizontally oriented slot 321.

The blade lock 4 is fitted into the front edges of the left case half 2 and the right case half 3.

Figure 4:
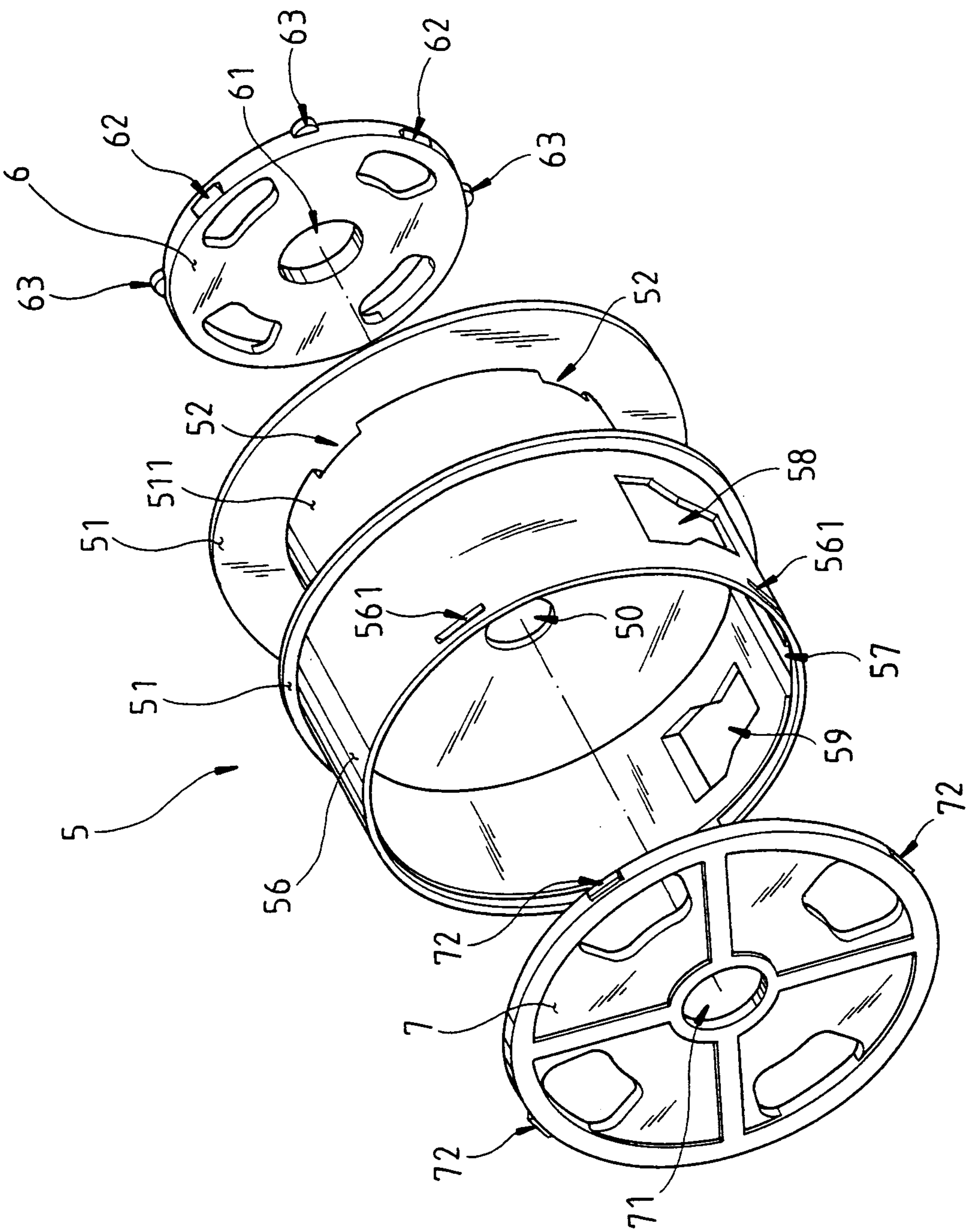
FIG. 4 is an exploded drawing of the blade spool 5 of the invention herein.
Figure 5:
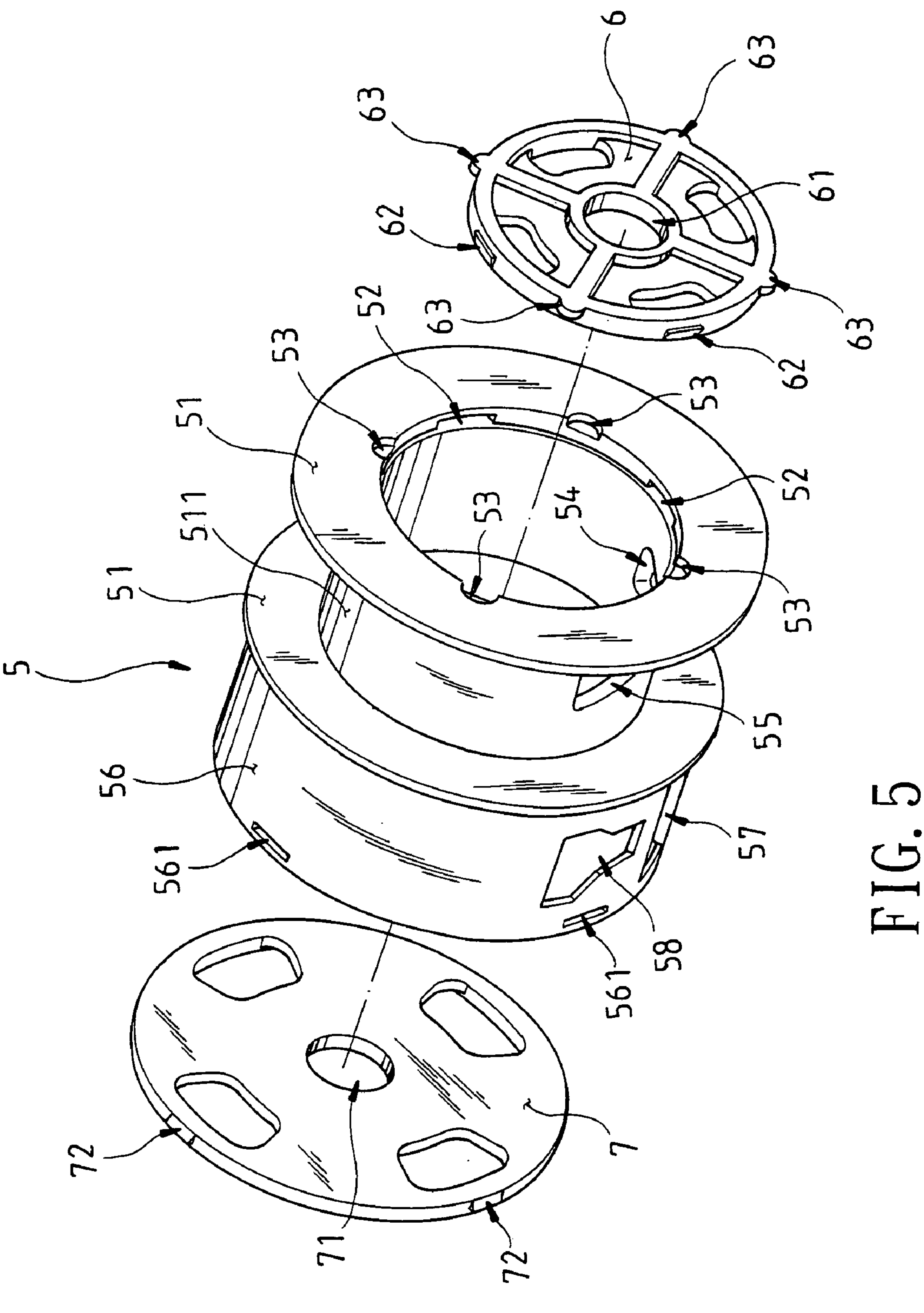
FIG. 5 is an exploded drawing the blade spool 5 of the invention herein.
Figure 6:
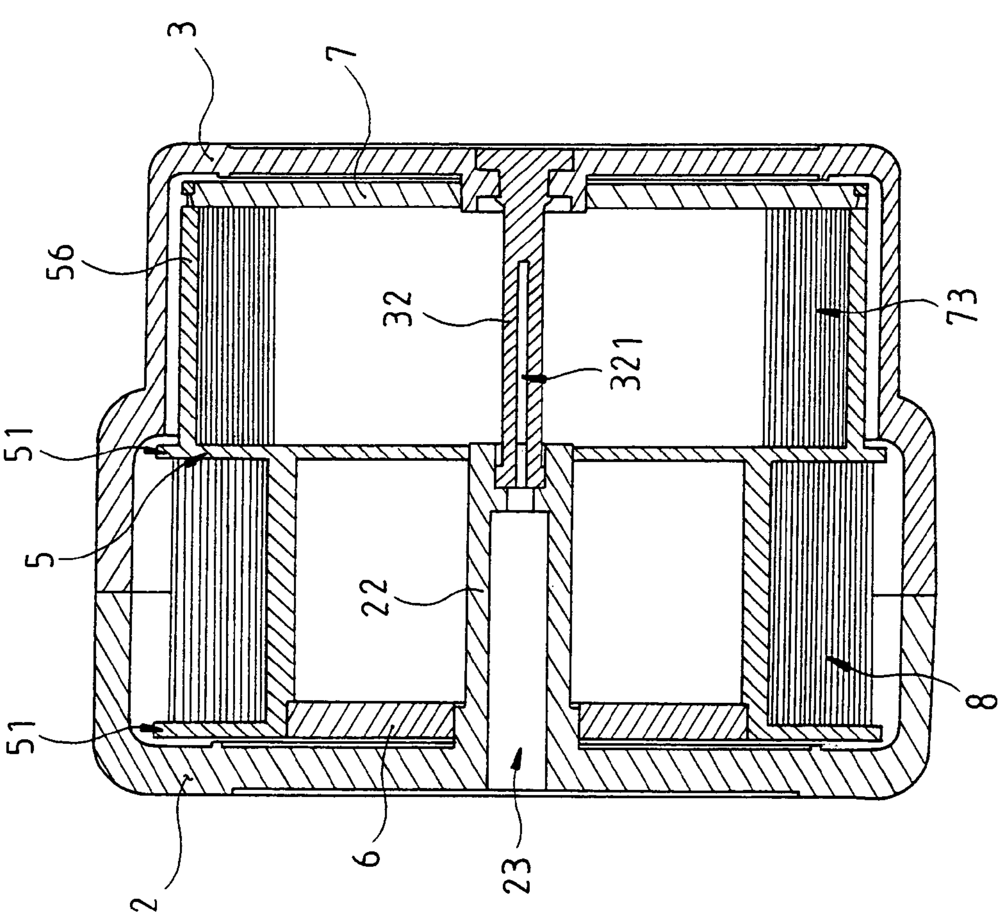
FIG. 6 is a cross-sectional drawing the invention herein, as viewed from the perspective line A—A in FIG. 1.

The blade spool 5, as indicated in FIG. 4 and FIG. 5, is of one-piece plastic construction and has flanges 51 along the center and one side, a plurality of catch slots 52 and semi-circular, arcuate mounting slots 53 along the inner edge at the outer side of one flange 51, two symmetrical blade mounting slots 54 and 55 respectively disposed on a blade retaining hub 511 between the said two flanges 51, and a plurality of catch slots 561 along the outer circumference of a tube-shaped reel 56 at the other side of the said blade spool 5, the said reel 56 having a rectangular hole 57 and, furthermore, two symmetrical mounting slots 58 and 59 respectively formed at the front and rear edges of the rectangular hole 57.

Additionally, a side cover plate 6 of one-piece plastic construction in the form of a circular plate that has a round shaft hole 61 through its center and, furthermore, a plurality of lock tabs 62 protruding along the outer circumference, with the said side cover plate 6 also having plurality of semicircular mounting tabs 63 protruding along its outer circumference; the said side cover plate 6 lock tabs 62 and mounting tabs 63 are snap-fitted into the catch slots 52 and the mounting slots 53 at one side of the blade spool 5, thereby providing for attachment to the blade spool 5.

Moreover, a spring cover plate 7 of one-piece plastic construction in the form of a circular plate that has a round shaft hole 71 through its center and, furthermore, a plurality of lock tabs 72 protruding along the outer circumference; the said spring cover plate 7 lock tabs 72 are snap-fitted into the catch slots 561 at the other side of the blade spool 5, and thereby attached to the blade spool 5.

Referring to FIG. 1, FIG. 2, FIG. 3, FIG. 4, FIG. 5, and FIG. 6, one extremity of the ruler blade 8 is inserted and fixed in the blade spool 5 blade mounting slot 55 and then wound onto the blade retaining hub 511 along one side of the blade spool 5 between the two flanges 51; one end of the said spring 73 is inserted and fixed in the blade spool 5 mounting slot 59 and then coiled within the reel 56, the center end in the coiled concentric said spring 73 is inserted and fixed in the center shaft 32 horizontally oriented slot 321; the left case half 2 and the right case half 3 are placed together, inserting the said center shaft 32 into the shaft tube 22, and a mounting screw 24 fastens them, a plurality of mounting screws 33 are then inserted into the right case half 3 mounting holes 31 and fastened in the left case half 2 threaded holes 21, the conjoinment completing the tape rule structure of the present invention.

In the structural component assembly of the invention herein, the blade spool 5 has space at one side of one-piece construction for containing the coiled spring 73, enabling the outer housing of the tape rule to have dimensions within a range of manual grasping and thus comply with ergonomic considerations, and the said blade spool 5 is capable of holding additional ruler blade length, increasing capacity such that it is approximately two to three times longer than that of a conventional tape rule, the improved structure herein thereby effectively enhancing tape rule utility and performance.

The invention herein can be assembled such that the blade spool 5 rotates 180 degrees, while the left case half 2 and the right case half 3 are structurally re-positioned with corresponding symmetry such that the original right-hand grasped tape rule structure is converted into a left-hand grasped tape rule structure to thereby enhance product assembly convenience and precision, providing even greater manufacturing practical value.

In summation of the foregoing section, since the invention herein remedies the shortcomings of the conventional product and in terms of utility is a leading innovation among products in the same category and, furthermore, capable of realizing even greater practical performance, the disclosed structure thereof is ensured to be capable of achieving the claimed objectives and is submitted for review and the granting of the commensurate patent rights.

What is claimed is:

1. An improved structure of a tape rule comprising:

a left case half being of a one-piece plastic construction and having a plurality of threaded holes disposed along a periphery of an interior of said left case half, said left case half having a shaft tube protruding from a center of said interior, and said shaft tube having a round hole extending through a center thereof;

a right case half being of a one-piece plastic construction and having a plurality of mounting holes disposed along a periphery of an interior of said right case half, said right case half having a metal center shaft disposed in aligned relationship with said shaft tube of said left case half, said metal center shaft having a circular rod-shaped, horizontally oriented slot formed therein, said right case half being fastened to said left case half said center shaft being inserted into the said shaft tube, said interiors of said left half case and right half case defining a cavity;

a blade lock being fitted into the front edges of the said left case half and the said right case half;

a blade spool disposed in said cavity and being of a one-piece plastic construction said blade spool having two flanges along a center and one side thereof, one of said flanges having a plurality of catch slots and semi-circular arcuate mounting slots along an inner edge at an outer side thereof, said blade spool having a blade retaining hub disposed between said two flanges, said blade retaining hub having two symmetrical blade mounting slots respectively formed therein, said blade spool having a tube-shaped reel at an opposing side thereof, said tube-shaped reel having a plurality of catch slots formed along an outer circumference thereof, said tub-shaped reel having a rectangular hole and two symmetrical mounting slots respectively formed at a front edge and a rear edge of said rectangular hole;

a side cover plate being of a one-piece plastic construction and a circular plate contour having a round shaft hole formed through a center thereof for passage of said shaft tube therethrough, said side cover plate having a plurality of lock tabs protruding along an outer circumference thereof and a plurality of semicircular mounting tabs protruding along said outer circumference, said side cover plate lock tabs and mounting tabs being snap-fit into said catch slots and said mounting slots at one side of said blade spool;

a spring cover plate being of a one-piece plastic construction and a circular plate contour having a round shaft hole formed through center thereof for passage of said metal center shaft therethrough, said spring cover plate having a plurality of lock tabs protruding along an outer circumference thereof, said lock tabs of said spring cover plate being snap-fit into said catch slots at said opposing side of said blade spool, said blade spool;

a ruler blade is having one end inserted and fixed in one of said blade mounting slots and being wound onto the said blade retaining hub along one side of said blade spool between said two flanges; and, a spring having one end inserted and fixed in said blade spool mounting slot and then coiled within said reel, an opposing end of said coiled spring being inserted and fixed in said horizontally oriented slot of said metal center shaft.

* * * * *